US008027812B2

(12) United States Patent
Hamaguchi

(10) Patent No.: US 8,027,812 B2
(45) Date of Patent: Sep. 27, 2011

(54) CHARGE TRAJECTORY CALCULATING METHOD, SYSTEM, AND PROGRAM

(75) Inventor: Akira Hamaguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 744 days.

(21) Appl. No.: 12/028,495

(22) Filed: Feb. 8, 2008

(65) Prior Publication Data

US 2008/0208542 A1    Aug. 28, 2008

(30) Foreign Application Priority Data

Feb. 8, 2007  (JP) ................................. 2007-029407

(51) Int. Cl.
*G06F 17/50* (2006.01)
(52) U.S. Cl. ........................................................ 703/1
(58) Field of Classification Search ........................ 703/6
See application file for complete search history.

(56) References Cited

U.S. PATENT DOCUMENTS

| 5,254,438 | A | 10/1993 | Owen et al. | |
| 5,987,236 | A * | 11/1999 | Yoneda | 703/13 |
| 7,197,404 | B2 * | 3/2007 | Holland | 702/28 |
| 7,732,761 | B2 * | 6/2010 | Tanaka et al. | 250/307 |
| 2004/0156030 | A1 | 8/2004 | Hansen | |
| 2007/0042513 | A1 * | 2/2007 | Nakasugi | 438/16 |

FOREIGN PATENT DOCUMENTS

JP    2002-075818    3/2002

OTHER PUBLICATIONS

Epfl, "Transmission Electron Microscopy" Chapter 3, 2000, http://cimewww.epfl.ch/people/cayron/Fichiers/thesebook-chap3.pdf, pp. 21-42.*

* cited by examiner

*Primary Examiner* — David Silver
(74) *Attorney, Agent, or Firm* — Finnegan, Henderson, Farabow, Garrett & Dunner, L.L.P.

(57) ABSTRACT

An embodiment of the present invention is a charge trajectory calculating method which calculates, by simulation, trajectories of charges scattered by irradiating a target object with a charged beam. The method includes: setting a simulation region, which corresponds to the existence region of the target object; dividing the simulation region into a plurality of segment regions; calculating, by a Monte Carlo calculation, the trajectories of charges scattered by irradiating the inside of a predetermined segment region with the charged beam; calculating, based on function values of an approximate function, the potential distribution which occurs in the simulation region by irradiating the outside of the predetermined segment region with the charged beam; and calculating, by a Monte Carlo calculation, and based on the potential distribution calculated based on the function values of the approximate function, the trajectories of charges scattered by irradiating the outside of the predetermined segment region with the charged beam.

18 Claims, 14 Drawing Sheets

|     | C1 | C2 | C3 | C4 | C5 |           |
|-----|----|----|----|----|----|-----------|
| R1  |    |    |    |    |    | P(a,x,0)  |
| R2  |    |    |    |    |    | P(a,x,L)  |
| R3  |    |    |    |    |    | P(a,x,2L) |
| R4  |    |    |    |    |    | P(a,x,3L) |
| R5  |    |    |    |    |    | P(a,x,4L) |

FIG. 7A

|     | C1 | C2 | C3 | C4 | C5 |                       |
|-----|----|----|----|----|----|-----------------------|
| R1  |    |    |    |    |    | P(2a,x,0)+P(a,x,L)    |
| R2  |    |    |    |    |    | P(2a,x,L)+P(a,x,0)    |
| R3  |    |    |    |    |    | P(2a,x,2L)+P(a,x,L)   |
| R4  |    |    |    |    |    | P(2a,x,3L)+P(a,x,2L)  |
| R5  |    |    |    |    |    | P(2a,x,4L)+P(a,x,3L)  |

FIG. 7B

|     | C1 | C2 | C3 | C4 | C5 |                                   |
|-----|----|----|----|----|----|-----------------------------------|
| R1  |    |    |    |    |    | P(3a,x,0)+P(2a,x,L)+P(a,x,2L)     |
| R2  |    |    |    |    |    | P(3a,x,L)+P(2a,x,0)+P(a,x,L)      |
| R3  |    |    |    |    |    | P(3a,x,2L)+P(2a,x,L)+P(a,x,0)     |
| R4  |    |    |    |    |    | P(3a,x,3L)+P(2a,x,2L)+P(a,x,L)    |
| R5  |    |    |    |    |    | P(3a,x,4L)+P(2a,x,3L)+P(a,x,2L)   |

FIG. 7C

|      | C1 | C2 | C3 | C4 | C5 |
|------|----|----|----|----|----|
| R1 → |    |    |    |    |    | P(4a,x,0)+P(3a,x,L)+P(2a,x,2L)+P(a,x,3L)
| R2 → |    |    |    |    |    | P(4a,x,L)+P(3a,x,0)+P(2a,x,L)+P(a,x,2L)
| R3 → |    |    |    |    |    | P(4a,x,2L)+P(3a,x,L)+P(2a,x,0)+P(a,x,L)
| R4 → |    |    |    |    |    | P(4a,x,3L)+P(3a,x,2L)+P(2a,x,L)+P(a,x,0)
| R5   |    |    |    |    |    | P(4a,x,4L)+P(3a,x,3L)+P(2a,x,2L)+P(a,x,L)

FIG. 7D

|      | C1 | C2 | C3 | C4 | C5 |
|------|----|----|----|----|----|
| R1 → |    |    |    |    |    | P(5a,x,0)+P(4a,x,L)+P(3a,x,2L)+P(2a,x,3L)+P(a,x,4L)
| R2 → |    |    |    |    |    | P(5a,x,L)+P(4a,x,0)+P(3a,x,L)+P(2a,x,2L)+P(a,x,3L)
| R3 → |    |    |    |    |    | P(5a,x,2L)+P(4a,x,L)+P(3a,x,0)+P(2a,x,L)+P(a,x,2L)
| R4 → |    |    |    |    |    | P(5a,x,3L)+P(4a,x,2L)+P(3a,x,L)+P(2a,x,0)+P(a,x,L)
| R5 → |    |    |    |    |    | P(5a,x,4L)+P(4a,x,3L)+P(3a,x,2L)+P(2a,x,L)+P(a,x,0)

FIG. 7E

CHARGE TRAJECTORY CALCULATING METHOD, SYSTEM, AND PROGRAM

CROSS REFERENCE TO RELATED APPLICATIONS

This application is based upon and claims the benefit of priority from the prior Japanese Patent Application No. 2007-29407, filed on Feb. 8, 2007, the entire contents of which are incorporated herein by reference.

BACKGROUND OF THE INVENTION

1. Field of the Invention

The present invention relates to a charge trajectory calculating method, system, and program.

2. Background Art

Scanning electron microscopes (SEMs) enable observation of extremely small objects. The importance of the SEM technology is growing with the development of the nanotechnology. In the semiconductor industry, the SEM technology has been used for inspection and length measurement.

Recently, in the semiconductor industry, requirements on the inspection and length measurement have become stricter as semiconductor design rules become finer. According to the strictest specification, precision in the inspection and length measurement has to be on the order of sub-nanometer. Further, in addition to high precision in the inspection and length measurement, high stability in the inspection and length measurement is also required. In order to meet the requirements, it is attempted to raise resolution and stability of an SEM apparatus to improve the hardware of an SEM, and attempted to develop such an inspection method and length measurement method as improving reproducibility to improve the software of an SEM.

When using an SEM, SEM conditions such as accelerating voltage, sample current, and bias voltage have to be optimized. Whether the SEM conditions can be appropriately optimized or not is largely dependent on the skill of an operator. When using the SEM, the operator places a measuring sample in the SEM, and optimizes the SEM conditions by varying the SEM conditions by trial and error. Optimization of the SEM conditions often takes a long time and may take several days in some cases. This has a significant effect on the turn around time (TAT) of a semiconductor manufacturing process. In the semiconductor manufacturing process, reduction of the TAT is imperative because the TAT has a significant effect on the cost. It is undesirable for the semiconductor manufacturing process to take a long time to optimize the SEM conditions.

In recent years, SEM simulations using the Monte Carlo method have become popular. In the past, a Monte Carlo calculation required an enormously long calculation time. However, the development of the information processing technology in recent years has enabled the Monte Carlo calculation to be performed in a relatively short time. According to an SEM simulation, the SEM conditions can be optimized without an actual measuring sample before the inspection or length measurement (see JP-A 2002-75818 (KOKAI)).

A typical flow of the SEM simulation will be described hereinafter.

First, a simulation region which corresponds to the existence region of a measuring object, is provided. In this step, the number of calculation meshes in the simulation region is determined, and the calculation meshes are provided in the simulation region. In this example, the number of calculation meshes in the simulation region is 9×9, i.e., 81.

Next, it is assumed that one of the meshes is irradiated with an electron beam. Then, trajectories of scattered charges, the charge distribution, and the potential distribution in the simulation region are calculated. Such a calculation is repeated 81 times on the assumption that the 81 meshes are scanned (i.e., successively irradiated) with the electron beam. The calculation may be performed by the two or more meshes. For example, if the calculation is performed by the three meshes, the calculation is repeated 27 times.

The calculation of the potential distribution from the charge distribution is performed using the Poisson equation. For the calculation, the finite element method is often used. When calculating the potential distribution, charge movement has to be appropriately taken into account. Further, to raise precision of the calculation of the potential distribution, fine meshes have to be provided. However, it is difficult to meet these requirements without increasing load on a computer and elongating time for calculating the potential distribution.

For this reason, it is attempted to perform an SEM simulation using a cluster PC, which includes a plurality of PCs. The cluster PC includes, for example, a master node and a plurality of cluster nodes. The master node generates a random number, distributes charge scattering calculations and charge distribution calculations among the cluster nodes, collects charge information from the cluster nodes, and performs potential distribution calculations. The computational capability of the cluster PC increases as the number of the cluster nodes increases.

Exchanges of data between the master node and the cluster nodes are performed via a network, such as a LAN. The time required for the data communication increases in proportion to the number of the cluster nodes. As the number of the cluster nodes increases, the proportion of the data communication time in the entire calculation time becomes considerable.

As described above, the SEM simulation has a large technical problem regarding how to reduce the calculation time.

SUMMARY OF THE INVENTION

An embodiment of the present invention is, for example, a charge trajectory calculating method of calculating, by simulation, trajectories of charges scattered by irradiating a target object with a charged beam, the method comprising: setting a simulation region, which corresponds to the existence region of the target object; dividing the simulation region into a plurality of segment regions; calculating, by a Monte Carlo calculation, the trajectories of charges scattered by irradiating the inside of a predetermined segment region with the charged beam; calculating, based on the Monte Carlo calculation, the charge distribution which occurs in the simulation region by irradiating the inside of the predetermined segment region with the charged beam; calculating, based on the charge distribution, the potential distribution which occurs in the simulation region by irradiating the inside of the predetermined segment region with the charged beam; calculating, based on the potential distribution or the charge distribution, function values of an approximate function of the potential distribution or the charge distribution; calculating, based on the function values of the approximate function, the potential distribution which occurs in the simulation region by irradiating the outside of the predetermined segment region with the charged beam; and calculating, by a Monte Carlo calculation, and based on the potential distribution calculated based on the function values of the approximate function, the trajectories of charges scattered by irradiating the outside of the predetermined segment region with the charged beam.

Another embodiment of the present invention is, for example, a charge trajectory calculating method of calculating, by simulation, trajectories of charges scattered by irradiating a target object with a charged beam, the method comprising: setting a simulation region, which corresponds to the existence region of the target object; retrieving measured data of the potential distribution which occurs in the target object by irradiating the target object with the charged beam, from a storage location at which the measured data is stored; setting the measured data retrieved from the storage location, as the potential distribution which occurs in the simulation region by irradiating the simulation region with the charged beam; and calculating, by a Monte Carlo calculation, the trajectories of charges scattered by irradiating the simulation region by the charged beam, on the assumption that the measured data retrieved from the storage location is set as the potential distribution in the simulation region.

Another embodiment of the present invention is, for example, a charge trajectory calculating system for calculating, by simulation, trajectories of charges scattered by irradiating a target object with a charged beam, the system comprising: a region setting section configured to set a simulation region, which corresponds to the existence region of the target object; a region dividing section configured to divide the simulation region into a plurality of segment regions; a charge trajectory calculating section configured to calculate, by a Monte Carlo calculation, the trajectories of charges scattered by irradiating the inside of a predetermined segment region with the charged beam; a charge distribution calculating section configured to calculate, based on the Monte Carlo calculation, the charge distribution which occurs in the simulation region by irradiating the inside of the predetermined segment region with the charged beam; a potential distribution calculating section configured to calculate, based on the charge distribution, the potential distribution which occurs in the simulation region by irradiating the inside of the predetermined segment region with the charged beam; an approximate function processing section configured to calculate, based on the potential distribution or the charge distribution, function values of an approximate function of the potential distribution or the charge distribution; a potential distribution approximating section configured to calculate, based on the function values of the approximate function, the potential distribution which occurs in the simulation region by irradiating the outside of the predetermined segment region with the charged beam; and a charge trajectory approximating section configured to calculate, by a Monte Carlo calculation, and based on the potential distribution calculated based on the function values of the approximate function, the trajectories of charges scattered by irradiating the outside of the predetermined segment region with the charged beam.

Another embodiment of the present invention is, for example, a charge trajectory calculating program for making a computer perform a charge trajectory calculating method, which calculates, by simulation, trajectories of charges scattered by irradiating a target object with a charged beam, the method comprising: setting a simulation region, which corresponds to the existence region of the target object; dividing the simulation region into a plurality of segment regions; calculating, by a Monte Carlo calculation, the trajectories of charges scattered by irradiating the inside of a predetermined segment region with the charged beam; calculating, based on the Monte Carlo calculation, the charge distribution which occurs in the simulation region by irradiating the inside of the predetermined segment region with the charged beam; calculating, based on the charge distribution, the potential distribution which occurs in the simulation region by irradiating the inside of the predetermined segment region with the charged beam; calculating, based on the potential distribution or the charge distribution, function values of an approximate function of the potential distribution or the charge distribution; calculating, based on the function values of the approximate function, the potential distribution which occurs in the simulation region by irradiating the outside of the predetermined segment region with the charged beam; and calculating, by a Monte Carlo calculation, and based on the potential distribution calculated based on the function values of the approximate function, the trajectories of charges scattered by irradiating the outside of the predetermined segment region with the charged beam.

Another embodiment of the present invention is, for example, a charge trajectory calculating program for making a computer perform a charge trajectory calculating method, which calculates, by simulation, trajectories of charges scattered by irradiating a target object with a charged beam, the method comprising: setting a simulation region, which corresponds to the existence region of the target object; retrieving measured data of the potential distribution which occurs in the target object by irradiating the target object with the charged beam, from a storage location at which the measured data is stored; setting the measured data retrieved from the storage location, as the potential distribution which occurs in the simulation region by irradiating the simulation region with the charged beam; and calculating, by a Monte Carlo calculation, the trajectories of charges scattered by irradiating the simulation region by the charged beam, on the assumption that the measured data retrieved from the storage location is set as the potential distribution in the simulation region.

BRIEF DESCRIPTION OF THE DRAWINGS

FIGS. 7A to 7E are diagrams for illustrating potential distributions at t=a, 2a, 3a, 4a, and 5a.

DESCRIPTION OF THE EMBODIMENTS

First Embodiment

Figure 1:
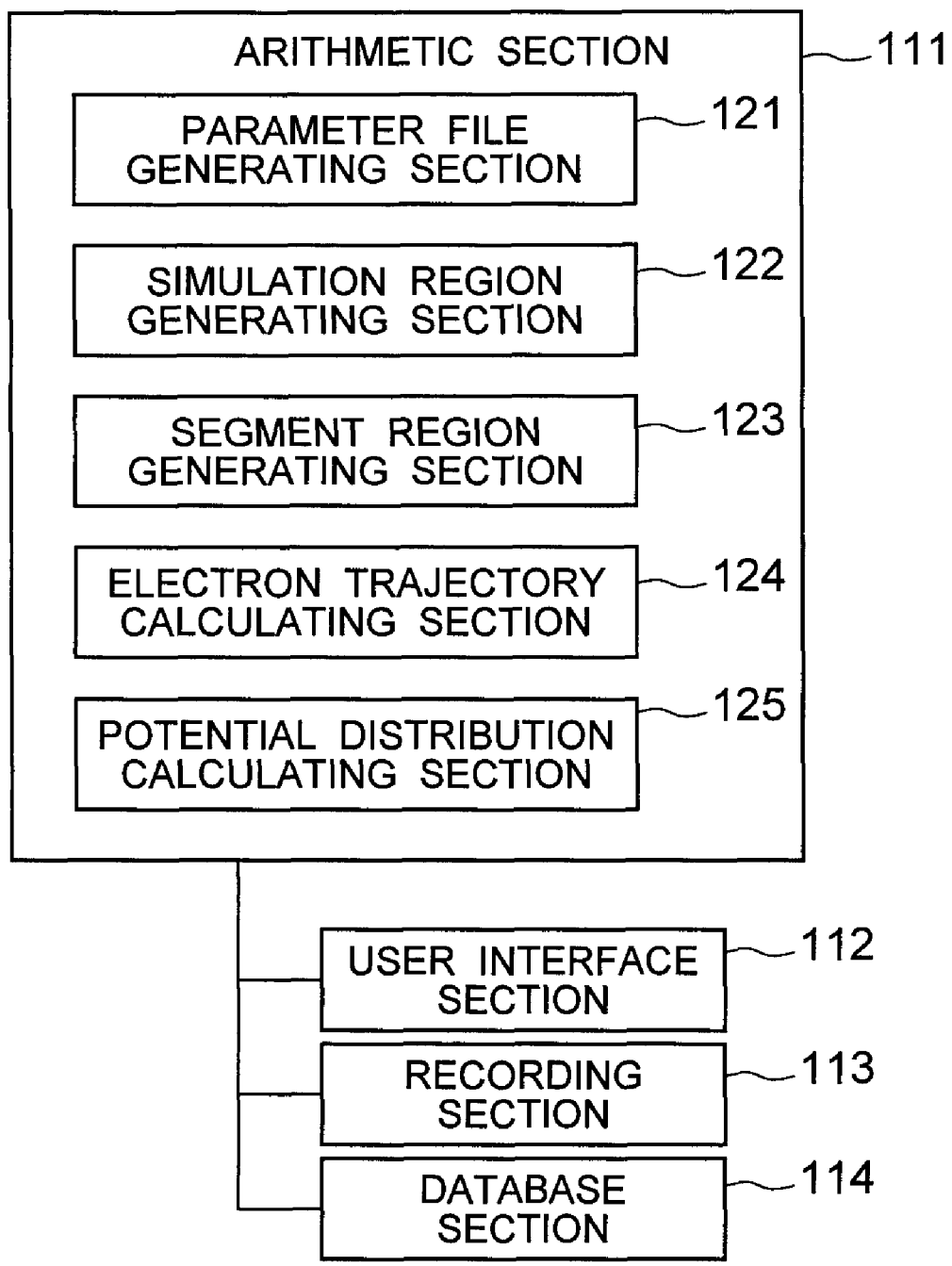
FIG. 1 is a functional block diagram of an SEM simulator.

FIG. 1 is a functional block diagram of an SEM simulator 101 configured to simulate an SEM measurement. The SEM simulator 101 in FIG. 1 is capable of calculating, by simulation, trajectories of electrons scattered by irradiating a target object (measuring object) with an electron beam. The SEM simulator 101 in FIG. 1 is a specific example of a charge trajectory calculating system. The SEM simulator 101 in FIG. 1 may be constituted by one PC or a plurality of PCs.

The SEM simulator 101 in FIG. 1 includes an arithmetic section 111, a user interface section 112, a recording section 113, and a database section 114. The arithmetic section 111 in FIG. 1 includes a parameter file generating section 121, a simulation region generating section 122 which is an example of a region setting section, a segment region generating section 123 which is an example of a region dividing section, an electron trajectory calculating section 124 which is an example of a charge trajectory calculating section, a charge distribution calculating section, and a charge trajectory approximating section, and a potential distribution calculating section 125 which is an example of a potential distribution calculating section, an approximate function processing section, and a potential distribution approximating section.

The arithmetic section 111 is a block which performs various arithmetic operations regarding an electron trajectory calculation. The user interface section 112 is a block through which an operator inputs various data required for the electron trajectory calculation, into the SEM simulator 101. For example, the operator can input various parameters regarding the irradiation conditions of the electron beam, and various parameters regarding the physical properties of the measuring object. Examples of the parameters include: accelerating voltage, electron number, scanning speed, beam diameter, and focus depth of incident electrons; various values regarding the physical properties of the measuring object, such as the work function, density, dielectric constant, and mobility of the measuring object; various data regarding the measuring object, such as plasmon scattering cross section and EBIC (electron beam induced current) image regarding the measuring object; characteristic amounts regarding the kind, composition, and structure of the measuring object; setting values regarding the simulation region; and the mesh size of the simulation region. The recording section 113 is a block which records results of various arithmetic operations regarding the electron trajectory calculation. The database section 114 is a block which stores data regarding a design pattern of a semiconductor device.

The parameter file generating section 121 is a block which generates a parameter file based on the data input through the user interface section 112. The parameter file is a data file for storing a set of data required for the electron trajectory calculation. Examples of the data include an EB parameter such as accelerating voltage and sample current, and a target object parameter such as pattern configuration and composition data. The generated parameter file is recorded in the recording section 113.

The simulation region generating section 122 is a block which generates a simulation region (calculation region), which corresponds to the existence region of the target object. The simulation region is generated based on the parameter file recorded in the recording section 113.

The segment region generating section 123 is a block which divides the simulation region into a plurality of segment regions (calculation segments). The segment regions are generated based on the design pattern stored in the database section 114.

The electron trajectory calculating section 124 is a block which performs the electron trajectory calculation based on the parameter file, on the assumption that the simulation region is irradiated with an electron beam. In the electron trajectory calculation, trajectories of electrons scattered by irradiating the simulation region with the electron beam, are calculated by a Monte Carlo calculation. In the Monte Carlo calculation, the trajectories of scattered electrons are calculated, and the amount of accumulated charges is calculated based on the electron emission ratio and the number of incident electrons. The electron trajectory calculating section 124 calculates, based on the Monte Carlo calculation, the charge distribution which occurs in the simulation region by irradiating the simulation region with the electron beam. The charge distribution calculation is particularly important, when the target object is an insulator. This is because, if the target object is an insulator, the target object is charged by irradiating it with the electron beam, and the electron trajectories are affected thereby. The calculated trajectories of scattered electrons and charge distribution are recorded in the recording section 113.

The potential distribution calculating section 125 is a block which calculates, based on the charge distribution, the potential distribution which occurs in the simulation region by irradiating the simulation region with the electron beam. The calculation of the potential distribution from the charge distribution is performed using the Poisson equation. For the calculation, the finite element method can be used. The calculated potential distribution is recorded in the recording section 113.

Figure 2:
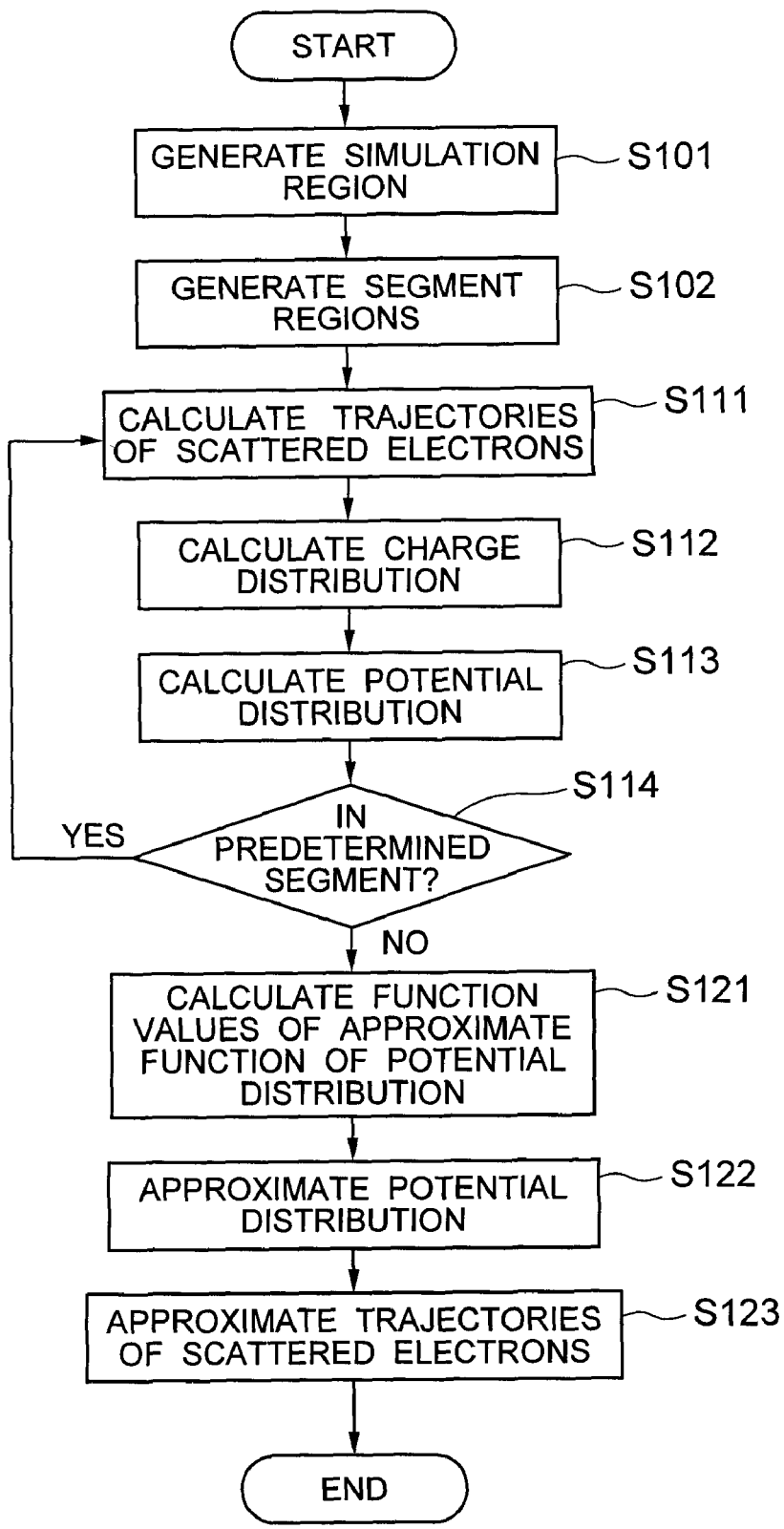
FIG. 2 is a flowchart regarding an SEM simulation.

FIG. 2 is a flowchart regarding an SEM simulation performed by the SEM simulator 101.

Figure 3:
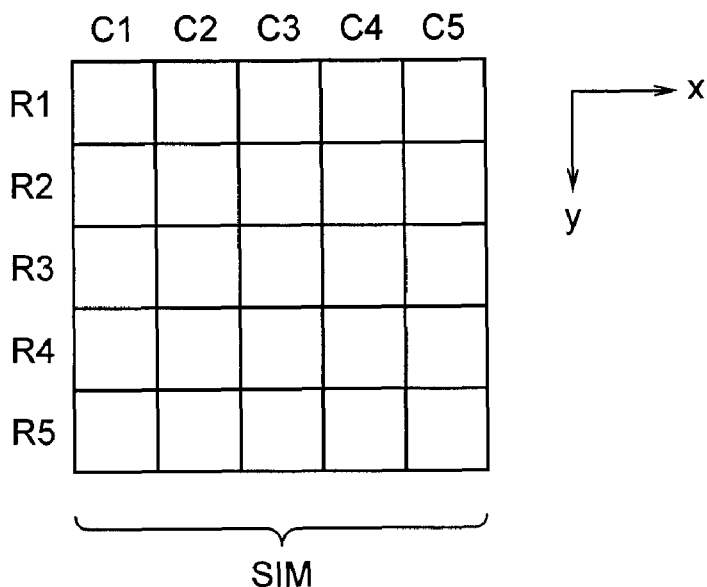
FIG. 3 is a diagram for illustrating a simulation region.

First, the simulation region generating section 122 sets a simulation region, and sets calculation meshes in the simulation region (S101). FIG. 3 shows 5×5 (=25) calculation meshes set in a simulation region "SIM".

Figure 4:
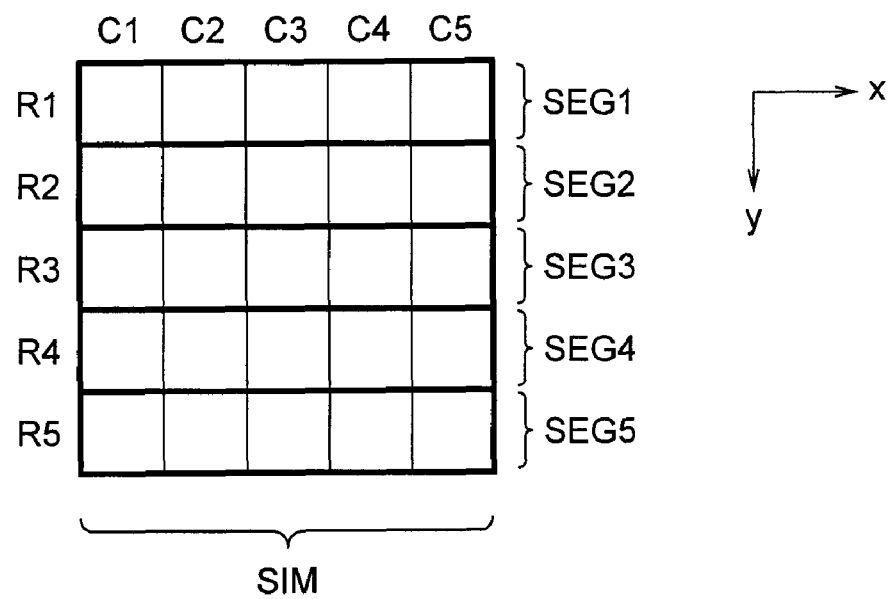
FIG. 4 is a diagram for illustrating segment regions.

Next, the segment region generating section 123 divides the simulation region into a plurality of segment regions (S102). FIG. 4 shows the simulation region "SIM" divided into 5 segment regions "SEG1" to "SEG5".

Figure 5:
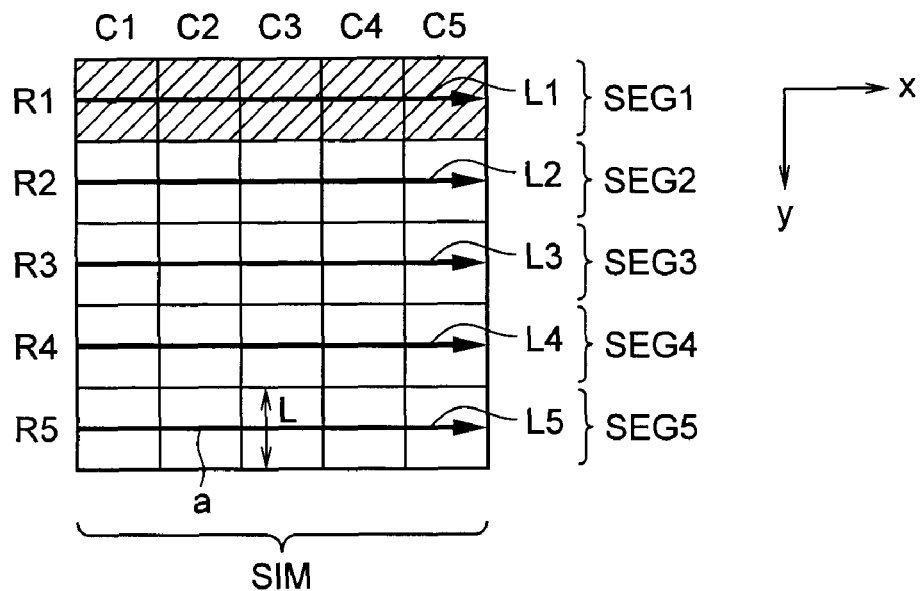
FIG. 5 is a diagram for illustrating an electron trajectory calculation.

Next, the SEM simulator 101 performs an electron trajectory calculation on the assumption that the simulation region is irradiated with an electron beam (S111 to S123). In this embodiment, as shown in FIG. 5, the electron trajectory calculation is performed on the assumption that the segment region "SEG1" is first scanned from left to right with the electron beam (scanning "L1"), the segment region "SEG2" is then scanned from left to right with the electron beam (scanning "L2"), similar scanning is carried out for the following segment regions, and the segment region "SEG5" is finally scanned from left to right with the electron beam (scanning "L5"). In this embodiment, the vertical width of each mesh is expressed by "L", and the scan time of each segment is expressed by "a".

The steps S111 to S123, in which it is assumed to irradiate the simulation region with the electron beam, include the steps S111 to S114 and the steps S121 to S123. In the steps S111 to S114, it is assumed to irradiate the inside of the segment region "SEG1", i.e., assumed to irradiate the meshes in the segment region "SEG1". In the steps S121 to S123, it is assumed to irradiate the outside of the segment region "SEG1", i.e., assumed to irradiate the meshes in the segment regions "SEG2" to "SEG5".

In the steps S111 to S114, the SEM simulator 101 calculates trajectories of scattered electrons, the charge distribution, and the potential distribution in the simulation region, on the assumption that one mesh in the segment region "SEG1" is irradiated with the electron beam.

First, the electron trajectory calculating section 124 calculates, by a Monte Carlo calculation, trajectories of electrons scattered by irradiating one mesh with the electron beam (S111). Next, the electron trajectory calculating section 124 calculates, based on the Monte Carlo calculation, the charge distribution which occurs in the simulation region "SIM" by irradiating the mesh with the electron beam (S112). Next, the potential distribution calculating section 125 calculates, based on the charge distribution, the potential distribution which occurs in the simulation region "SIM" by irradiating the mesh with the electron beam (S113). The calculation of the potential distribution from the charge distribution is performed using the Poisson equation represented as the following equation (1). In the equation (1), "ρ" denotes the charge density, "φ" denotes the potential, and "∈" denotes the dielectric constant.

$$\rho = -\in \nabla^2 \phi \quad (1)$$

The calculation described above is repeatedly performed five times, on the assumption that the five meshes in the segment region "SEG1" are successively irradiated with the electron beam, in other words, on the assumption that the scanning "L1" is performed (S114). As described in "Background Art", the calculation may be performed by the two or more meshes.

Following the steps S111 to S114, the SEM simulator 101 carries out the steps S121 to S123. In the steps S121 to S123, the SEM simulator 101 calculates the potential distribution and trajectories of scattered electrons in the simulation region, on the assumption that the twenty meshes in the segment regions "SEG2" to "SEG5" are successively irradiated with the electron beam, following the five meshes in the segment region "SEG1". In other words, it is assumed that the scannings "L2" to "L5" are performed following the scanning "L1".

In this case, as the simplest method for determining the potential distribution, the same potential distribution as that for the segment region "SEG1" calculated in the steps S111 to S114 can be applied to the segment regions "SEG2" to "SEG5". This method can be considered to be effective for a measuring object having a high mobility. According to this method, the loop calculation (S111 to S114) performed in the scanning "L1" can be omitted for the scannings "L2" to "L5", so that the time for the SEM simulation can be substantially reduced. On the other hand, for a measuring object having a low mobility such as an insulator, the method described below can be considered to be effective.

First, the potential distribution calculating section 125 calculates, based on the potential distribution φ (x, y) calculated in the steps S111 to S114, function values of an approximate function P (t, x, y) that approximates the time evolution of the potential distribution φ (x, y) (S121). Here, φ (x, y) is the potential distribution in the simulation region "SIM", calculated in the steps S111 to S114, and P (t, x, y) is an approximate function of the potential distribution φ (x, y), which approximates the time evolution of the potential distribution φ (x, y). In the potential distribution φ (x, y) and the approximate function P (t, x, y), "t" denotes the time, "x" denotes the x-coordinate, and "y" denotes the y-coordinate. The approximate function P (t, x, y) at t=a, i.e., P (a, x, y), is equal to the potential distribution φ (x, y). The axes of the x-coordinate and the y-coordinate are defined as shown in FIG. 5.

In this embodiment, the function values of the approximate function P (t, x, y) are calculated using a differential equation containing the approximate function P (t, x, y). More specifically, the differential equation is a diffusion equation represented as the following equation (2), which is a partial differential equation whose variables are the time and the coordinates, and is a kind of elliptic equation. In other words, the approximate function P (t, x, y) is a solution of a diffusion equation. This means that the time evolution of the potential distribution φ (x, y) is approximated using a diffusion equation. In the equation (2), "D" denotes the diffusion coefficient.

$$\frac{\partial P}{\partial t} = D\nabla^2 P \quad (2)$$

Figure 6:
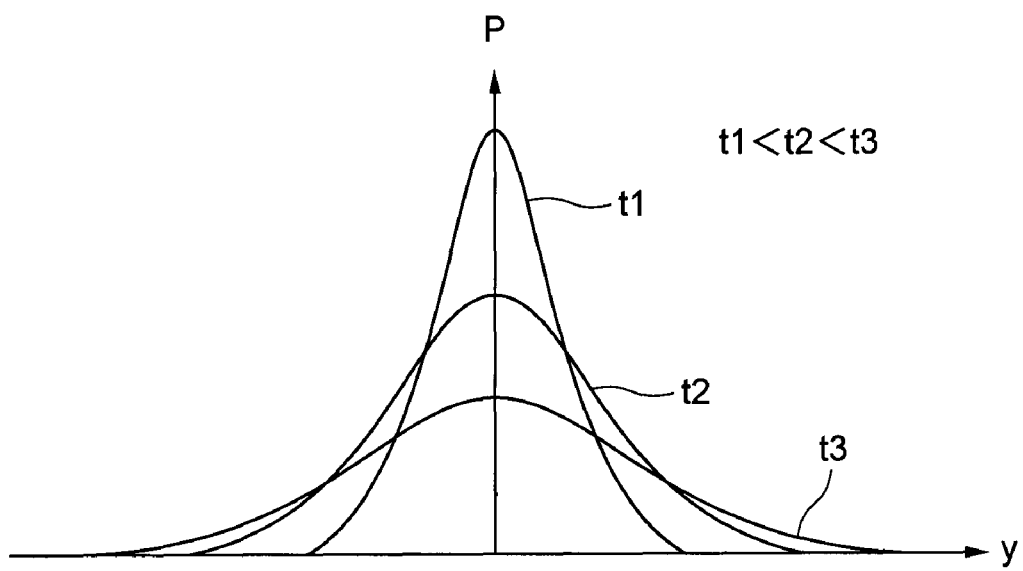
FIG. 6 shows examples of a graph of an approximate function of a potential distribution.

The potential distribution calculating section 125 calculates the function values of the approximate function P (t, x, y) by numerically solving the diffusion equation, using the potential distribution φ (x, y) as the initial condition. Consequently, the function values of the approximate function P (t, x, y) at various time and coordinates are calculated. FIG. 6 shows examples of a graph of the approximate function P (t, x, y). In this drawing, the ordinate indicates "P", and the abscissa indicates "y". FIG. 6 shows the approximate function P (t, x, y) at t=t1, t2, and t3 (t1<t2<t3).

The differential equation may be a partial differential equation or an elliptic equation other than the diffusion equation. In that case, the mobility, dielectric constant, specific resistance or the like of the measuring object may be taken into account as a parameter of the equation. Further, if the expression of the approximate function is available, the function values of the approximate function may be calculated using the expression. Examples of the expression include the expression whose variables are time and coordinates, e.g., the expression which is a solution of the diffusion equation.

Next, the potential distribution calculating section 125 calculates, based on the function values of the approximate function P (t, x, y), the potential distribution which occurs in the simulation region "SIM" by irradiating the inside of the segment regions "SEG2" to "SEG5" (S122). The calculation of the potential distribution will be described with reference to FIGS. 7A to 7E.

FIG. 7A is a diagram for illustrating the potential distribution at t=a. The potential distribution is given when the scanning "L1" is completed. The potential distribution at t=a is expressed by φ (x, y) which is calculated in the steps S111 to S114, i.e., expressed by P (a, x, y). Therefore, at t=a, the potential in the segment region "SEG1" is expressed by P (a, x, 0), the potential in the segment region "SEG2" is expressed by P (a, x, L), the potential in the segment region "SEG3" is expressed by P (a, x, 2L), and so on.

FIG. 7B is a diagram for illustrating the potential distribution at t=2a. The potential distribution is given when the scanning "L2" is completed. The potential distribution at t=2a can be calculated by superimposing a first potential distribution caused by the scanning "L1" and a second potential distribution caused by the scanning "L2". The first potential distribution corresponds to the time evolution of φ (x, y), and therefore, it can be calculated by substituting t=2a into P (t, x, y). The second potential distribution corresponds to a translation of φ (x, y), and therefore, it can be calculated by translating P (a, x, y) by "L" in the y direction. Therefore, at t=2a, the potential in the segment region "SEG1" is expressed by P (2a, x, 0)+P (a, x, L), the potential in the segment region "SEG2" is expressed by P (2a, x, L)+P (a, x, 0), the potential in the segment region "SEG3" is expressed by P (2a, x, 2L)+P (a, x, L), and so on.

FIG. 7C is a diagram for illustrating the potential distribution at t=3a. The potential distribution is given when the scanning "L3" is completed. The potential distribution at t=3a can be calculated by superimposing a first potential distribution caused by the scanning "L1", a second potential distribution caused by the scanning "L2", and a third potential distribution caused by the scanning "L3". The first potential distribution corresponds to the time evolution of φ (x, y), and therefore, it can be calculated by substituting t=3a into P (t, x, y). The second potential distribution corresponds to the time evolution of a translation of φ (x, y), and therefore, it can be calculated by translating P (2a, x, y) by "L" in the y direction. The third potential distribution corresponds to a translation of φ (x, y), and therefore, it can be calculated by translating P (a, x, y) by "2L" in the y direction. Therefore, at t=3a, the potential in the segment region "SEG1" is expressed by P (3a, x, 0)+P (2a, x, L)+P (a, x, 2L), the potential in the segment region "SEG2" is expressed by P (3a, x, L)+P (2a, x, 0)+P (a, x, L), the potential in the segment region "SEG3" is expressed by P (3a, x, 2L)+P (2a, x, L)+P (a, x, 0), and so on.

Similarly, the potential distribution at t=4a is given as shown in FIG. 7D, and the potential distribution at t=5a is given as shown in FIG. 7E. In this way, the potential distribution at t=5a, i.e., the potential distribution which occurs in the simulation region "SIM" by irradiating the segment regions "SEG2" to "SEG5", is calculated. The potential distribution at t=5a is the potential distribution which occurs finally in the simulation region "SIM" by irradiating the simulation region "SIM" with the electron beam. This potential distribution occurs in the simulation region "SIM" by irradiating the segment regions "SEG2" to "SEG5", following the segment region "SEG1".

The potential distribution calculating section 125 calculates the potential distribution at t=5a, as the potential distribution which occurs in the simulation region "SIM" by irradiating the segment regions "SEG2" to "SEG5". The potential distribution calculating section 125 need not calculate the potential distributions at t=2a, 3a, and 4a, and is needed only to calculate the potential distribution at t=5a. To calculate the potential distribution at t=5a, the function values of the approximate function P (t, x, y) shown in FIG. 7E are needed. More precisely, the function values of the approximate function P (t, x, y) shown in FIG. 7E into which x=0, L, 2L, 3L, and 4L are substituted are needed. The potential distribution calculating section 125 calculates these values required for the calculation in the step S122, in the step S121.

Next, the electron trajectory calculating section 124 calculates, by a Monte Carlo calculation, and based on the potential distribution calculated base on the function values of the approximate function P (t, x, y), trajectories of electrons scattered by irradiating the segment regions "SEG2" to "SEG5" with the electron beam (S123). In this way, the trajectories of electrons scattered by irradiating the segment regions "SEG2" to "SEG5" following the segment region "SEG1", are calculated.

Figure 8:
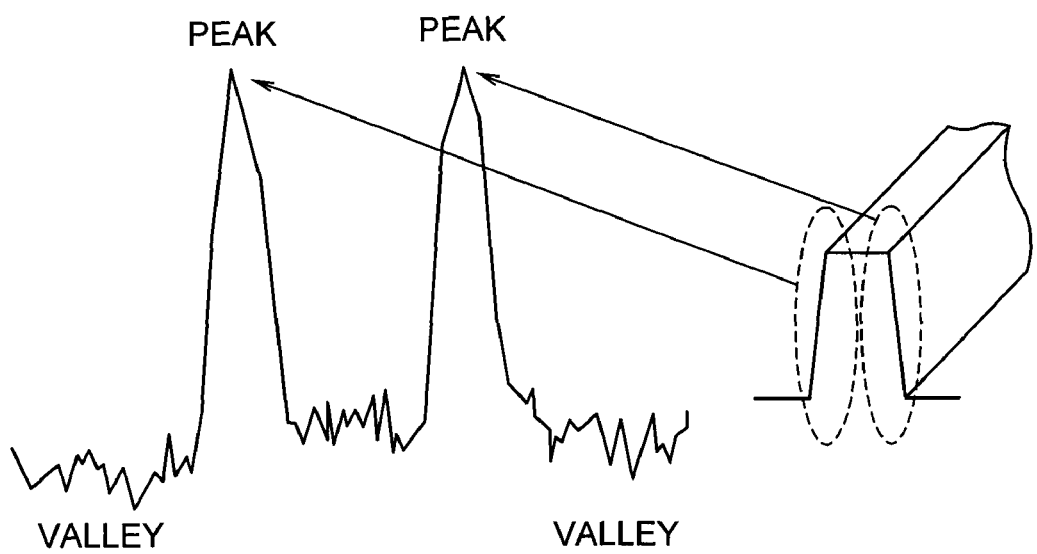
FIG. 8 shows an example of an SEM image obtained by the SEM simulation.
Figure 9:
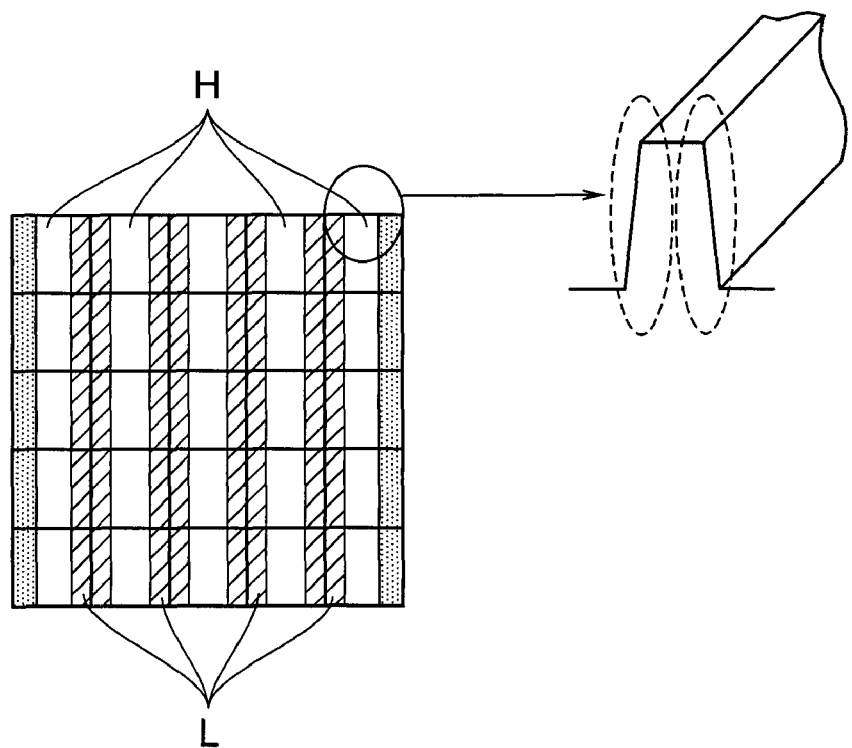
FIG. 9 shows an example of a design pattern of a target object.

The electron trajectory calculating section 124 can calculate an SEM image, based on the trajectories of scattered electrons calculated in the step S123. FIG. 8 shows an example of such an SEM image. As a design pattern of the target object, the pattern shown in FIG. 9 is assumed. Peaks in FIG. 8 reflect the edges of "H" parts (high parts) in FIG. 9, and valleys in FIG. 8 reflect "L" parts (low parts) in FIG. 9.

The SEM simulation according to this embodiment has been described above. In this embodiment, the electron trajectory calculation regarding the scannings "L2" to "L5" is performed not by the same loop calculation as that for the scanning "L1" (S111 to S114), but by the simpler approximate calculation (S121 to S123). Consequently, in this embodiment, the time for the SEM simulation can be substantially reduced.

This embodiment is particularly advantageous when the SEM simulation is performed by a cluster PC. According to this embodiment, the amount of data exchanged between a master node and a cluster node is reduced, in the electron trajectory calculation regarding the scannings "L2" to "L5". This is because the amount of the calculation regarding the electron scattering is reduced and the calculation of the charge distribution is not needed. Consequently, in this embodiment, the time for the SEM simulation can be further reduced.

This embodiment can also be applied to a charged beam other than the electron beam. Examples of such a charged beam include an ion beam.

The approximate function in the steps S121 to S123 may be an approximate function that approximates the time evolution of the charge distribution. In this case, in the step S121, the function values of the approximate function of the charge distribution is calculated based on the charge distribution calculated in the steps S111 to S114. In the step S122, the charge distribution which occurs by irradiating the inside of the segment regions "SEG2" to "SEG5" is calculated based on the function values of the approximate function of the charge distribution. Then, the potential distribution calculating section 125 calculates, based on the charge distribution, the potential distribution which occurs by irradiating the segment regions "SEG2" to "SEG5" with the electron beam. The calculation of the potential distribution from the charge distribution is performed using the Poisson equation described above. Then, in the step S123, trajectories of electrons scattered by irradiating the segment regions "SEG2" to "SEG5" by the electron beam is calculated by a Monte Carlo calculation and based on the potential distribution.

Figure 10:
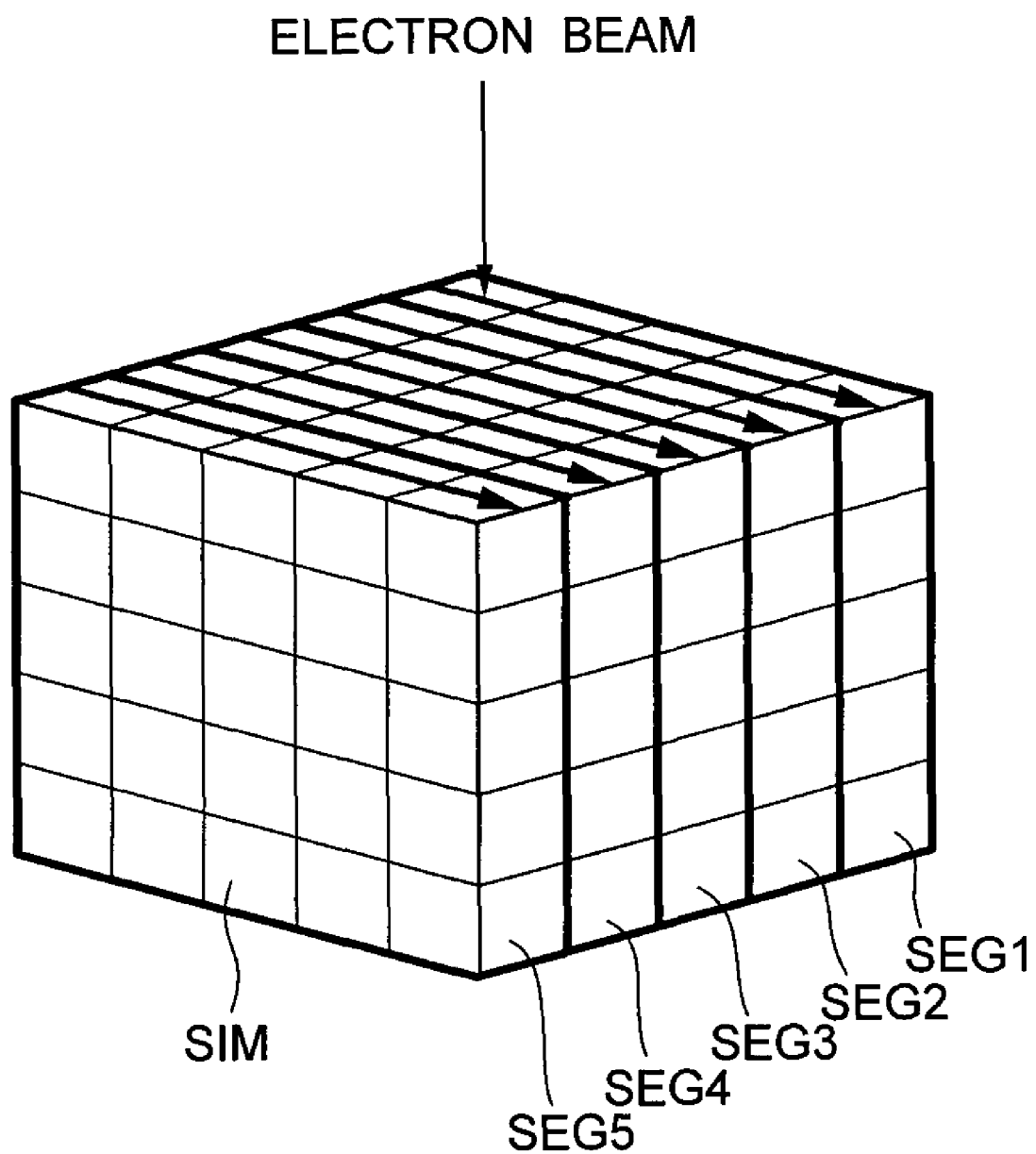
FIG. 10 is a diagram for illustrating a three-dimensional calculation mesh configuration.

Further, in this embodiment, the calculation meshes can be configured three-dimensionally rather than two-dimensionally. When the two-dimensional mesh configuration is employed, the linear segments as shown in FIG. 4 can be employed for example. Examples of the two-dimensional meshes include triangular meshes, quadrangular meshes, and hybrid meshes including various polygonal meshes. On the other hand, when the three-dimensional mesh configuration is employed, the planar segments as shown in FIG. 10 can be employed for example. Examples of the three-dimensional meshes include tetrahedral meshes, hexahedral meshes, and hybrid meshes including various polyhedral meshes.

Other various modifications of the segment configuration are possible. In the following, various modifications of the segment configuration will be described.

Figure 11A:
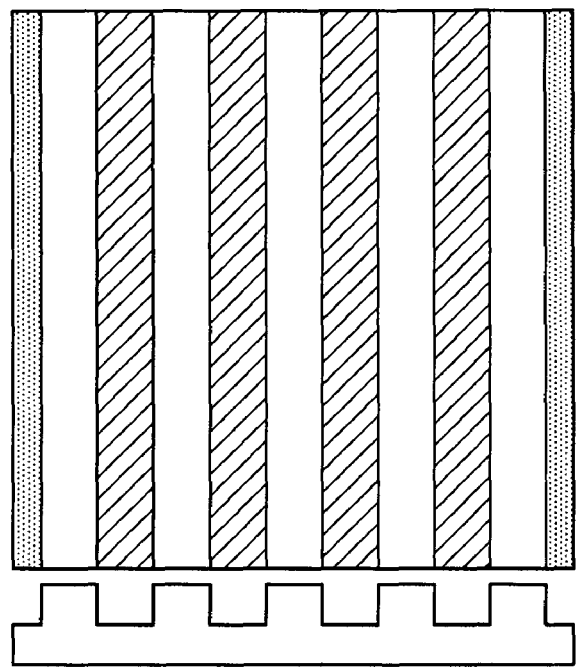
FIGS. 11A to 11H are diagrams for illustrating various modifications of segment configuration.

FIG. 11A shows an example of a periodic design pattern. The design pattern includes a line pattern in which five lines extending in the y-direction occur periodically in the x-direction. The scanning direction of the electron beam is the x-direction, as in the embodiment described above.

Figure 11B:
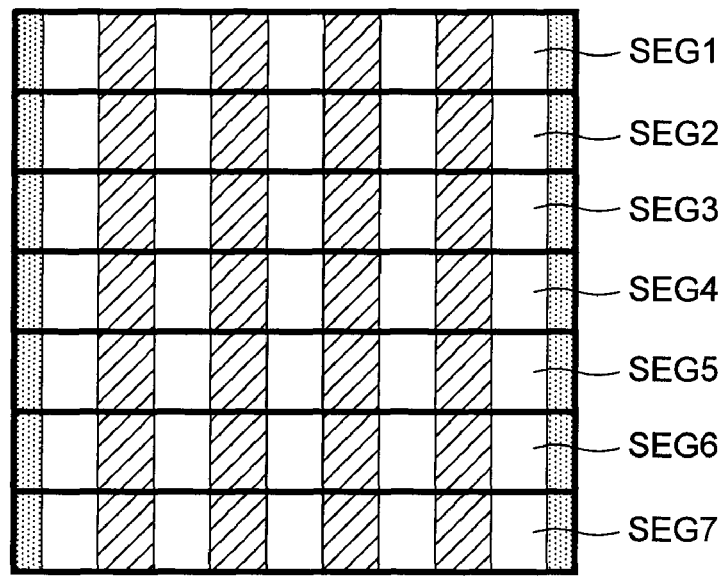

FIG. 11B shows an example of a segment configuration in this case. In FIG. 11B, the simulation region is divided into seven linear segment regions "SEG1" to "SEG7" extending in the x-direction. Each segment region is a region to be scanned in one scanning (scanning region). That is, in FIG. 11B, the simulation region is divided into segment regions by the scanning region. In this case, the electron trajectory calculation can be performed, for example, by extrapolating the result of the loop calculation for the segment region "SEG1" to the segment regions "SEG2" to "SEG7", as in the embodiment described above.

Figure 11C:
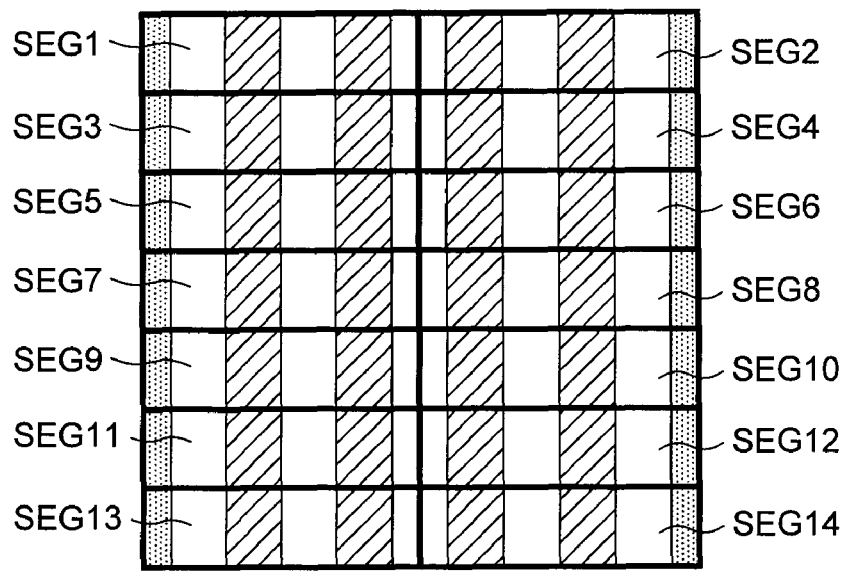

FIG. 11C shows another example of the segment configuration. In FIG. 11C, each segment region shown in FIG. 11B is further divided equally into two. That is, while one segment region is provided in each scanning region in FIG. 11B, a plurality of (two in this example) segment regions are provided in each scanning region in FIG. 11C. This configuration is provided in consideration for the linear symmetry of the design pattern shown in FIG. 11A with regard to the centerline. In this case, the electron trajectory calculation can be performed, for example, by extrapolating the result of the loop calculation for the segment region "SEG1" to the segment regions "SEG2" to "SEG14". In this case, the time for the SEM simulation is reduced compared with the case shown in FIG. 11B.

Figure 11D:
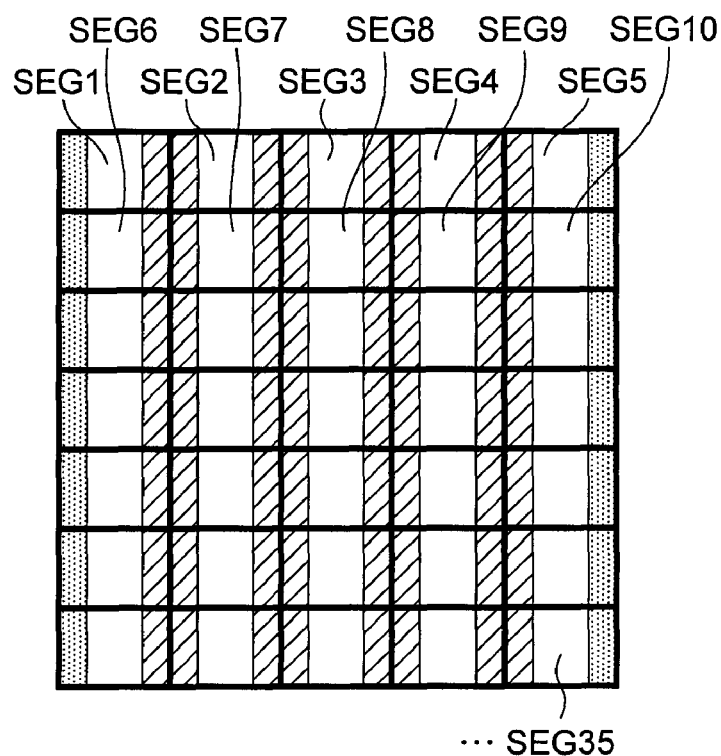

FIG. 11D shows another example of the segment configuration. In FIG. 11D, each segment region shown in FIG. 11B is further divided equally into five. In this case, the electron trajectory calculation can be performed, for example, by extrapolating the result of the loop calculation for the segment region "SEG1" to the segment regions "SEG5", "SEG6", "SEG10" and the like, and extrapolating the result of the loop calculation for the segment region "SEG2" to the segment regions "SEG3", "SEG4", "SEG7", "SEG8", "SEG9" and the like. In this case, the time for the SEM simulation is reduced compared with the cases shown in FIGS. 11B and 11C. The loop calculations are performed for the segment regions "SEG1" and "SEG2" in this case, because the charged state of the simulation region often differs between the inside and the periphery of the simulation region. To further raise the calculation precision, the electron trajectory calculation can be performed, for example, by extrapolating the result of the loop calculation for the segment region "SEG1" to the segment regions "SEG5", "SEG6", "SEG10" and the like, extrapolating the result of the loop calculation for the segment region "SEG2" to the segment regions "SEG4", "SEG7", "SEG9" and the like, and extrapolating the result of the loop calculation for the segment region "SEG3" to the segment regions "SEG8" and the like. In this way, it is important that the division of the simulation region and the selection of the segment regions for which the loop calculations are performed are carried out in view of the calculation precision.

Figure 11E:
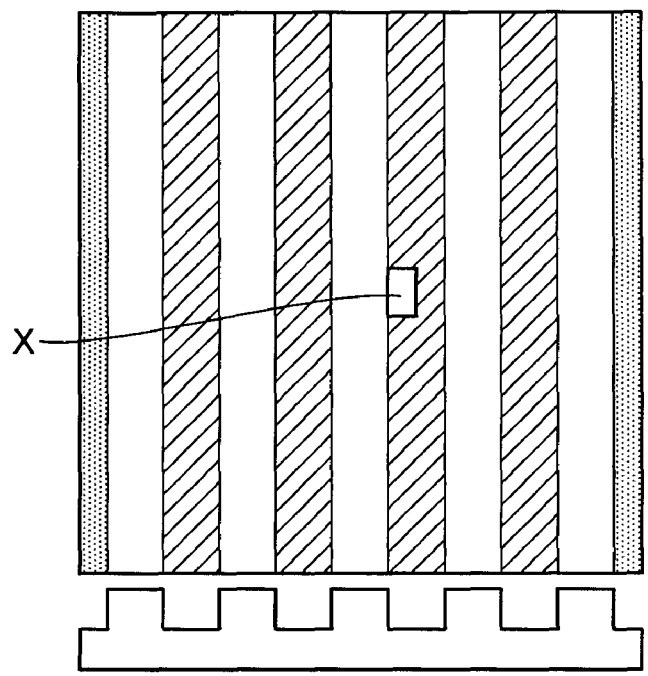

FIG. 11E shows an example of a non-periodic design pattern. The design pattern shown in FIG. 11E includes a pattern in which a structure "X" disturbing the periodicity is placed in the design pattern shown in FIG. 11A. The scanning direction of the electron beam is the x-direction, as in the embodiment described above.

Figure 11F:
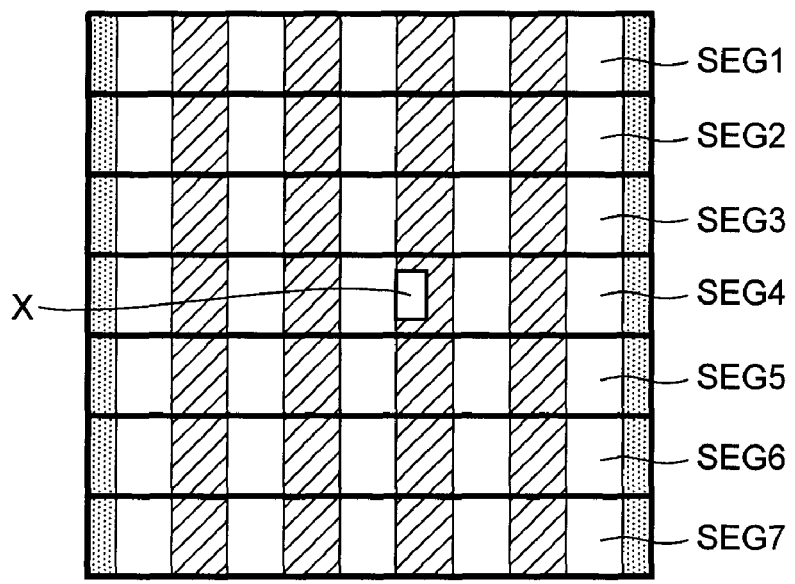

FIG. 11F shows an example of a segment configuration in this case. In FIG. 11F, the simulation region is divided into seven linear segment regions "SEG1" to "SEG7" extending in the x-direction, as in FIG. 11B. The structure "X" exists in the segment region "SEG4". In FIG. 11F, the simulation region is divided into the segment regions "SEG1" to "SEG3" and "SEG5" to "SEG7", each of which has a periodic pattern, and the segment region "SEG4", which has a non-periodic pattern. In this case, the electron trajectory calculation can be performed, for example, by extrapolating the result of the loop calculation for the segment region "SEG1" to the segment regions "SEG2" to "SEG3" and "SEG5" to "SEG7", and separately performing the electron trajectory calculation for the segment region "SEG4". In this example, the number of segment regions having a periodic pattern is six, and the number of segment regions having a non-periodic pattern is one. However, the number of the segment regions having a periodic pattern and the number of the segment regions having a non-periodic pattern can be arbitrarily determined.

Figure 11G:
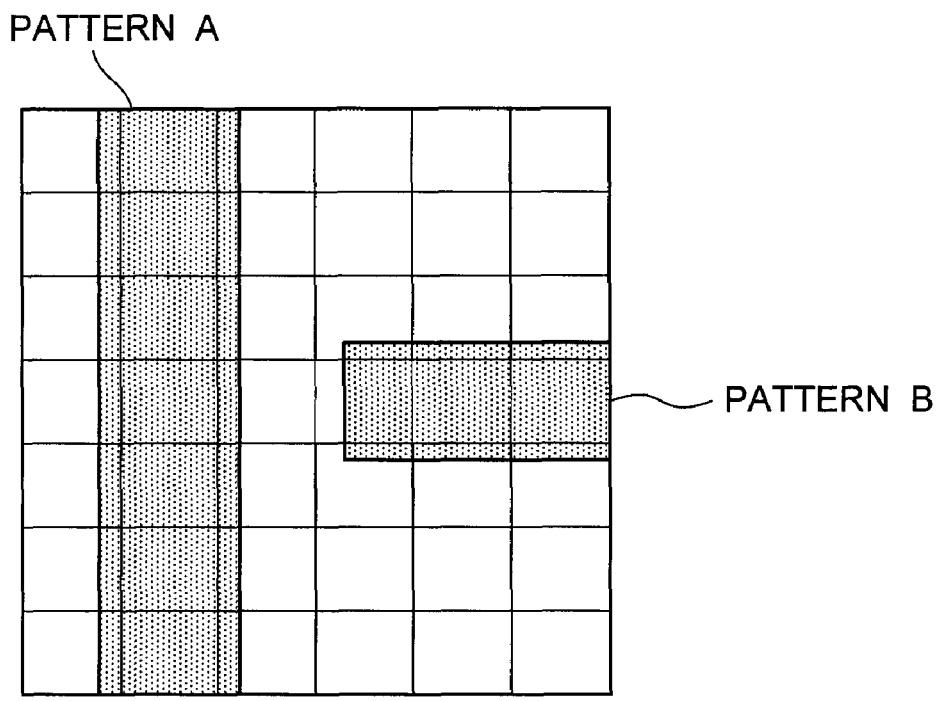

FIG. 11G shows a further example of a design pattern. The design pattern includes a pattern "A" and a pattern "B". The scanning direction of the electron beam is the x-direction, as in the embodiment described above.

In this case, the simulator 101 may automatically group the segment regions based on contour data of the design data. The automatic grouping is achieved, for example, by extracting vector components. The simulator 101 extracts vector components from the contour data regarding the patterns "A" and "B,", and automatically groups the segment regions based on the vector components.

Figure 11H:
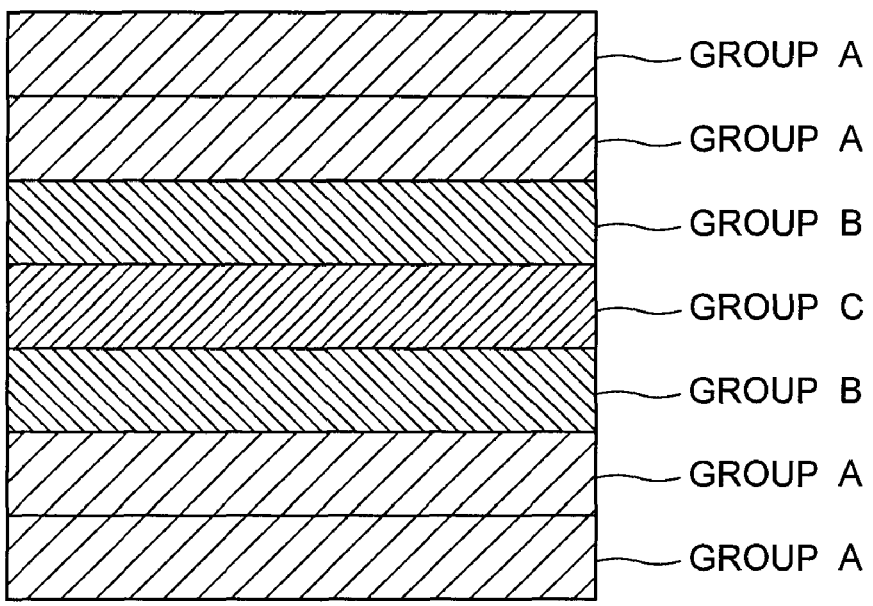

FIG. 11H shows an example of such grouping. In FIG. 11H, the segment regions that are equivalent in vector components in the meshes are grouped into the same group. In FIG. 11H, seven segment regions are grouped into a group "A", a group "B", and a group "C" according to the vector components in the x-direction. In the grouping, the vector components in the x-direction are used. However, the vector components in the y-direction may be used.

The electron trajectory calculation is performed for each group. The result of the loop calculation for one segment region in the group "A" is extrapolated to other segment regions in the group "A". The result of the loop calculation for one segment region in the group "B" is extrapolated to other segment regions in the group "B".

Various modifications of the segment configuration have been described. In addition, as an electron trajectory calculation method, extrapolation of the result of the loop calculation for a predetermined segment region (a segment region for which the loop calculation is to be performed) to other segment regions has been described. The number of segment regions for which the loop calculation is to be performed may be two or more. To reduce the time for the electron trajectory calculation, it is important that each segment region is as small as possible in view of the characteristics of the design pattern and the required calculation precision.

Second Embodiment

In the first embodiment, there has been described a method of calculating a potential distribution or a charge distribution based on function values of an approximate function. The approximate function may include a coefficient which originates from a coefficient in a differential equation or an expression. Examples of such a coefficient include the diffusion coefficient of the diffusion equation.

To calculate the function values of the approximate function, the value of the coefficient of the approximate function has to be previously determined. In the first embodiment, it is assumed that a known experimental value is used as the value of the coefficient of the approximate function. However, the simulation using the known experimental value may provide an incorrect result. Therefore, in the second embodiment, a value automatically determined by the simulator 101 is used as the value of the coefficient of the approximate function. Therefore, according to the second embodiment, a coefficient value that provides a correct simulation result can be determined.

Figure 12:
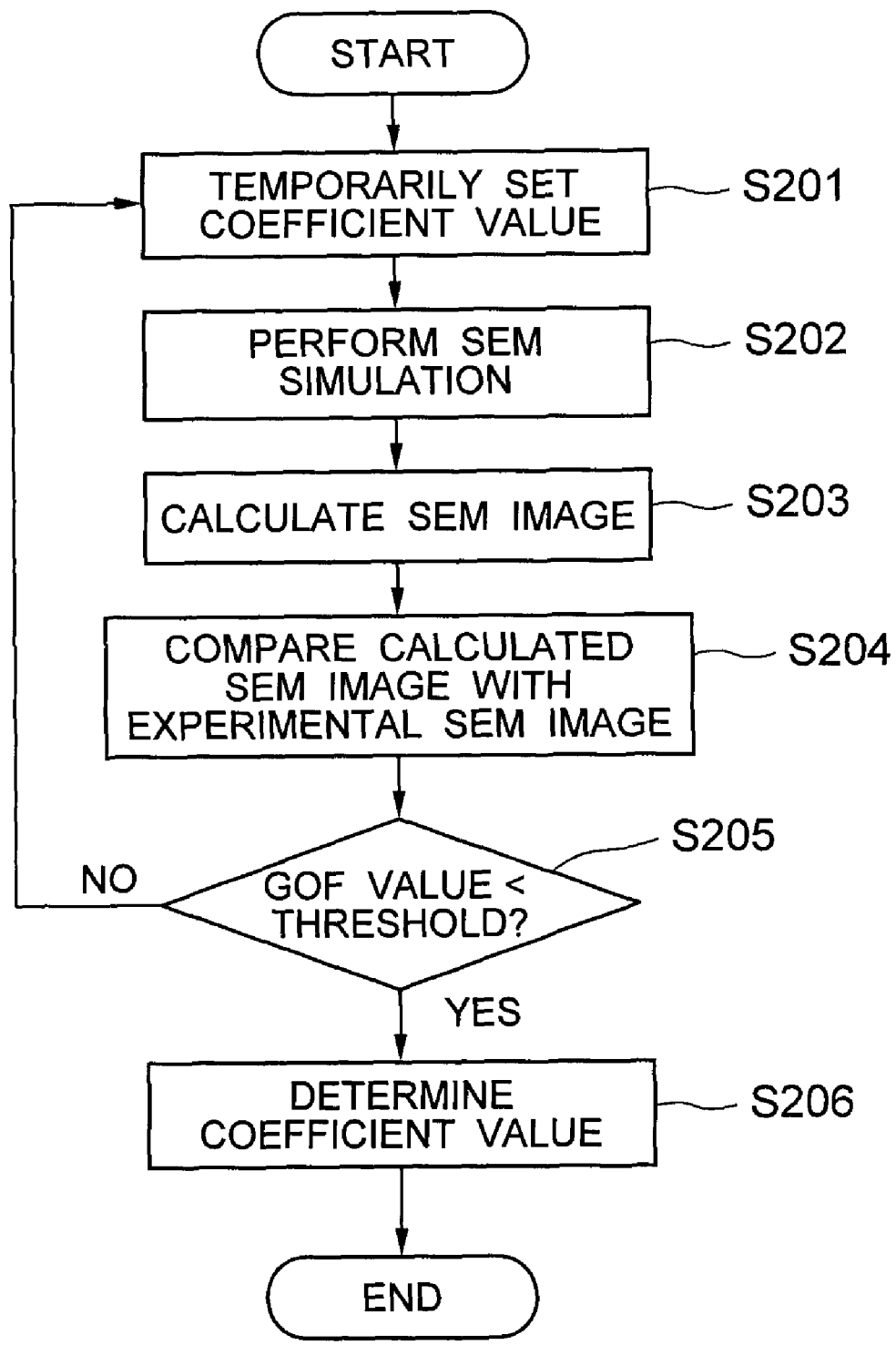
FIG. 12 is a flowchart regarding a second embodiment.

In the following, with reference to FIG. 12, a method of automatically determining the value of the coefficient of the approximate function will be described.

First, the simulator 101 temporarily sets a value of the coefficient of the approximate function (S201). Specifically, for example, a parameter (the setting range, the step size, or the like) for temporarily setting the coefficient value is set, and the coefficient value is set based on the parameter.

Next, the simulator 101 performs the electron trajectory calculation shown in the steps S101 to S123 in FIG. 2, using the coefficient value (S202). Next, the simulator 101 calculates the SEM image of the measuring object, based on the result of the electron trajectory calculation (S203).

Next, the simulator 101 compares the SEM image obtained by the calculation with an SEM image obtained by an experiment (S204). For the comparison of the SEM images, image matching between the SEM images can be used, for example.

Figure 13:
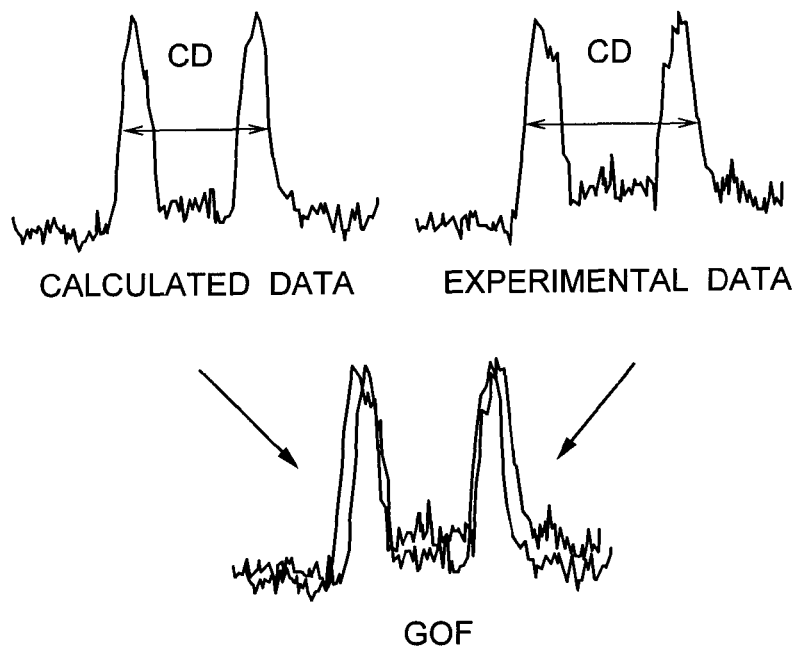
FIG. 13 is a diagram for illustrating matching between SEM images.

As shown in FIG. 13, the simulator 101 superimposes the SEM images (secondary electron profiles) on one another, calculates the difference between them, and determines whether the resulting difference value (GOF value) is less than a threshold or not.

If the difference value is equal to or more than the threshold (S205), the simulator 101 performs the steps S201 to S204 again. In this case, the value of the coefficient of the approximate function is changed. On the other hand, if the difference value is less than the threshold (S205), the simulator 101 designates the temporarily set value in S201, as the value of the coefficient of the approximate function (S206). In this way, the simulator 101 determines the value of the coefficient of the approximate function, based on the result of the comparison between the SEM images.

In the step S204, the SEM image obtained in the steps S201 to S203 is compared with the SEM image obtained previously. In this example, the latter SEM image is an SEM image obtained experimentally. However, the latter SEM image may be an SEM image obtained by another SEM simulation method.

The simulator 101 may perform the steps S201 to S204 for all the coefficient values in the setting range. In this case, the simulator 101 may designate the coefficient value that provides the smallest difference value, as the value of the coefficient of the approximate function (S205 to S206). In this case, the steps S201 to S204 are performed for each of the coefficient values.

The data to be compared in the step S204 may be shape data other than the SEM image. For example, the distance between lines formed on the measuring object may be used. Instead of the SEM image itself, the amplitude of the peak of the SEM image, the width of the peak of the SEM image, the ratio between the amplitude and the width, or the contrast ratio based on the data about the peak and the valley of the SEM image may be used. In this case, a calculation for obtaining such shape data is performed in the step S203.

Third Embodiment

In the first embodiment, trajectories of scattered electrons are calculated using the potential distribution obtained by calculation. On the other hand, in the third embodiment, trajectories of scattered electrons are calculated using previously prepared measured data of the potential distribution. Therefore, according to the third embodiment, the time for the SEM simulation can be substantially reduced. Examples of the potential measuring method include a potential measuring method using the correlation between the sample surface potential and the focus value in the SEM apparatus, a surface potential measuring method using KFM, and a potential measuring method using a capacitance sensor.

Figure 14:
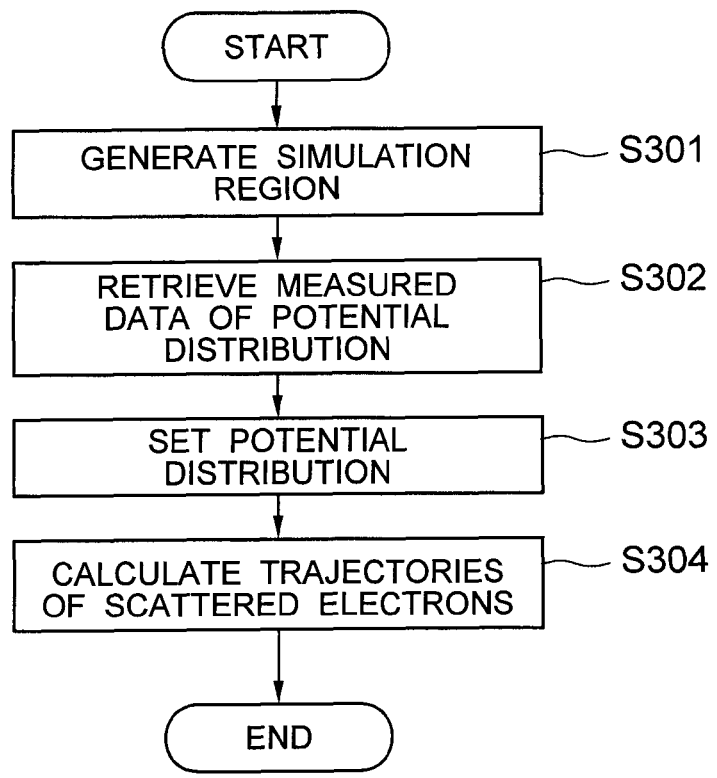
FIG. 14 is a flowchart regarding a third embodiment.

FIG. 14 is a flowchart regarding the SEM simulation according to this embodiment.

First, the simulation region generating section 122 sets a simulation region, and sets calculation meshes in the simulation region (S301). This step is same as the step S101 in FIG. 2.

Next, the potential distribution calculating section 125 retrieves measured data of the potential distribution, from a storage location at which the measured data is stored (S302). The measured data is previously obtained by potential distribution measurement for a target object of the SEM simulation. In other words, the measured data is previously obtained by measuring the potential distribution which occurs in the target object by irradiating the target object with an electron beam. In this embodiment, the storage location is the database section 114 shown in FIG. 1.

Next, the potential distribution calculating section 125 sets the measured data retrieved from the storage location, as the potential distribution which occurs in the simulation region by irradiating the simulation region with the electron beam (S303).

Next, the electron trajectory calculating section 124 calculates, by a Monte Carlo calculation, trajectories of electrons scattered by irradiating the simulation region with the electron beam, on the assumption that the measured data retrieved from the storage location is set as the potential distribution in the simulation region (S304).

The SEM simulation process performed by the SEM simulator 101 in the first to third embodiments can be performed by a computer program (a charge trajectory calculating program), for example. The program is stored in a storage in the SEM simulator 101 and executed by a processor in the SEM simulator 101, for example.

As described above, with regard to a charge trajectory calculating method, system, and program that calculate, by simulation, trajectories of charges scattered by irradiating a target object with a charged beam, the embodiments of the present invention can reduce the calculation time.

The invention claimed is:

1. A charge trajectory calculating method of calculating, by simulation, trajectories of charges scattered by irradiating a target object with a charged beam, the method comprising:
    setting a simulation region, which corresponds to an existence region of the target object;
    dividing the simulation region into a plurality of segment regions;
    calculating, by a Monte Carlo calculation, the trajectories of charges scattered by irradiating an inside of a predetermined segment region with the charged beam;
    calculating, based on the Monte Carlo calculation, a charge distribution which occurs in the simulation region by irradiating the inside of the predetermined segment region with the charged beam;
    calculating, based on the charge distribution, a potential distribution which occurs in the simulation region by irradiating the inside of the predetermined segment region with the charged beam;
    calculating, based on the potential distribution or the charge distribution, function values of an approximate function of the potential distribution or the charge distribution;
    calculating, based on the function values of the approximate function, the potential distribution which occurs in the simulation region by irradiating an outside of the predetermined segment region with the charged beam; and
    calculating, by the Monte Carlo calculation, and based on the potential distribution calculated based on the function values of the approximate function, the trajectories of charges scattered by irradiating the outside of the predetermined segment region with the charged beam.

2. The method according to claim 1, wherein the potential distribution which occurs by irradiating the inside of the predetermined segment region, is calculated using a Poisson equation.

3. The method according to claim 1, wherein the approximate function is a function which approximates a time evolution of the potential distribution or a time evolution of the charge distribution.

4. The method according to claim 1, wherein the function values of the approximate function are calculated using a differential equation containing the approximate function, or using an expression of the approximate function.

5. The method according to claim 4, wherein the differential equation containing the approximate function is a diffusion equation.

6. The method according to claim 4, wherein the expression of the approximate function is a solution of a diffusion equation.

7. The method according to claim 4, wherein the function values of the approximate function are calculated by numerically solving the differential equation, using the potential distribution or the charge distribution as an initial condition.

8. The method according to claim 1, wherein the simulation region is divided into the plurality of segment regions so that each scanning region in the simulation region is provided with one segment region.

9. The method according to claim 1, wherein the simulation region is divided into the plurality of segment regions so that each scanning region in the simulation region is provided with two or more segment regions.

10. The method according to claim 1, wherein two or more segment regions are selected from the plurality of segment regions, and each of the selected segment regions is used as the predetermined segment region.

11. The method according to claim 1, wherein,
when calculating the potential distribution which occurs by irradiating the outside of the predetermined segment region, the potential distribution is calculated based on the function values of the approximate function, with regard to the potential distribution which occurs by irradiating a segment region including a periodic pattern, and
the potential distribution is calculated separately, with regard to the potential distribution which occurs by irradiating a segment region including a non-periodic pattern.

12. The method according to claim 1, wherein the plurality of segment regions are grouped based on contour data of the target object included in design data of the target object, the design data being data representing a design of the target object, and the contour data being data representing a contour of the target object.

13. The method according to claim 1, further comprising:
temporarily setting a value of a coefficient of the approximate function to perform the charge trajectory calculating method;
performing a calculation to obtain a shape of the target object, based on a result of the charge trajectory calculating method;
comparing first shape data of the target object obtained by the calculation of the shape, with second shape data of the target object obtained before the calculation of the shape to be compared with the first shape data; and
determining the value of the coefficient of the approximate function, based on a result of the comparison of the first shape data and the second shape data.

14. The method according to claim 13, wherein the second shape data is obtained by an experiment performed before the calculation of the shape, or a simulation performed before the calculation of the shape.

15. The method according to claim 13, wherein the first shape data and the second shape data are images of the target object.

16. A charge trajectory calculating system comprising at least one computer for calculating, by simulation, trajectories of charges scattered by irradiating a target object with a charged beam, the at least one computer comprising:
a region setting section configured to set a simulation region, which corresponds to an existence region of the target object;
a region dividing section configured to divide the simulation region into a plurality of segment regions;
a charge trajectory calculating section configured to calculate, by a Monte Carlo calculation, the trajectories of charges scattered by irradiating an inside of a predetermined segment region with the charged beam;
a charge distribution calculating section configured to calculate, based on the Monte Carlo calculation, a charge distribution which occurs in the simulation region by irradiating the inside of the predetermined segment region with the charged beam;
a potential distribution calculating section configured to calculate, based on the charge distribution, a potential distribution which occurs in the simulation region by irradiating the inside of the predetermined segment region with the charged beam;
an approximate function processing section configured to calculate, based on the potential distribution or the charge distribution, function values of an approximate function of the potential distribution or the charge distribution;
a potential distribution approximating section configured to calculate, based on the function values of the approximate function, the potential distribution which occurs in the simulation region by irradiating an outside of the predetermined segment region with the charged beam; and
a charge trajectory approximating section configured to calculate, by the Monte Carlo calculation, and based on the potential distribution calculated based on the function values of the approximate function, the trajectories of charges scattered by irradiating the outside of the predetermined segment region with the charged beam.

17. A computer readable record medium storing a charge trajectory calculating program for making a computer perform a charge trajectory calculating method, which calculates, by simulation, trajectories of charges scattered by irradiating a target object with a charged beam, the method comprising:
setting a simulation region, which corresponds to an existence region of the target object;
dividing the simulation region into a plurality of segment regions;
calculating, by a Monte Carlo calculation, the trajectories of charges scattered by irradiating an inside of a predetermined segment region with the charged beam;
calculating, based on the Monte Carlo calculation, a charge distribution which occurs in the simulation region by irradiating the inside of the predetermined segment region with the charged beam;
calculating, based on the charge distribution, a potential distribution which occurs in the simulation region by irradiating the inside of the predetermined segment region with the charged beam;
calculating, based on the potential distribution or the charge distribution, function values of an approximate function of the potential distribution or the charge distribution;
calculating, based on the function values of the approximate function, the potential distribution which occurs in the simulation region by irradiating an outside of the predetermined segment region with the charged beam; and calculating, by the Monte Carlo calculation, and based on the potential distribution calculated based on the function values of the approximate function, the trajectories of charges scattered by irradiating the outside of the predetermined segment region with the charged beam.

18. The medium according to claim 17, wherein the method further comprises:

temporarily setting a value of a coefficient of the approximate function to perform the charge trajectory calculating method;

performing a calculation with regard to a shape of the target object, based on a result of the charge trajectory calculating method;

comparing shape data of the target object obtained by the calculation of the shape, with shape data of the target object previously obtained before the calculation of the shape; and determining the value of the coefficient of the approximate function, based on a result of the comparison of the shape data.

* * * * *